United States Patent [19]

Shimizu et al.

[11] Patent Number: 5,166,870
[45] Date of Patent: Nov. 24, 1992

[54] PULSE WIDTH-MODULATION CONTROL DEVICE FOR INVERTOR DEVICES

[75] Inventors: Motohiro Shimizu; Masashi Nakamura, both of Wako, Japan

[73] Assignee: Honda Giken Kogyo Kabushiki Kaisha, Tokyo, Japan

[21] Appl. No.: 777,079

[22] Filed: Oct. 16, 1991

[30] Foreign Application Priority Data

Nov. 16, 1990 [JP] Japan .................. 2-310964

[51] Int. Cl.$^5$ ............................. H02M 7/525
[52] U.S. Cl. ........................ 363/41; 363/98; 363/132
[58] Field of Search .............. 363/17, 98, 132, 41

[56] References Cited

U.S. PATENT DOCUMENTS

| | | | |
|---|---|---|---|
| 4,475,149 | 10/1984 | Gallios | 363/17 |
| 4,527,228 | 7/1985 | Chi Yu | 363/98 |
| 4,608,499 | 8/1986 | Rathmann | 363/132 |
| 4,646,217 | 2/1987 | Baroni et al. | 363/17 |
| 4,651,267 | 3/1987 | Nguyen et al. | 363/132 |
| 4,748,532 | 5/1988 | Commander et al. | 363/98 |
| 4,758,941 | 7/1988 | Felton et al. | 363/17 |
| 4,872,100 | 10/1989 | Diaz | 363/132 |
| 4,916,599 | 4/1990 | Traxler et al. | 363/98 |

FOREIGN PATENT DOCUMENTS 59-132398 9/1984 Japan .
60-82098 5/1985 Japan .

*Primary Examiner*—Steven L. Stephan
*Assistant Examiner*—Jeffrey Sterrett
*Attorney, Agent, or Firm*—Frishauf, Holtz, Goodman & Woodward

[57] ABSTRACT

A pulse width-modulation control device includes a superposed signal creating circuit for superposing a sine wave signal having a predetermined frequency upon a triangular wave signal as a carrier signal, having a frequency higher than the predetermined frequency to form a superposed signal. A pulse width modulating circuit compares the superposed signal with a predetermined threshold level to form a pulse width modulated signal. A pulse width limiting circuit limits the pulse width of the pulse width modulated signal when the pulse width modulated signal has a pulse width lying outside a predetermined range, and supplies a pulse signal having a pulse width thus limited to a switching device.

7 Claims, 5 Drawing Sheets

(b")

(b')

(b)

(c)

(j)

PULSE WIDTH-MODULATION CONTROL DEVICE FOR INVERTOR DEVICES

BACKGROUND OF THE INVENTION

1. Field of the Invention

This invention relates to a pulse width-modulation control device for invertor devices, and more particularly to a pulse width-modulation control device for an invertor device of the pulse width-modulation type for use in portable AC power units.

2. Prior Art

In recent years, portable AC power units are increasing in number which are equipped with invertor devices for stabilizing the output frequency. For example, a portable power unit which generates AC power having an commercial frequency by means of a AC generator driven by an engine is known, e.g. by Japanese Provisional Utility Model Publication (Kokai) No. 59-132398, in which the engine is operated within a high speed range to cause the AC generator to generate high AC output, the output is converted into direct current, then the direct current is converted into alternating current by an invertor device, and the alternating current is outputted.

In the meanwhile, there is a demand for AC power units of this kind whose output waveform is as close to a sine wave dependent upon their application as possible. To this end, an attempt has been made to employ an invertor device of the pulse width-modulation type as the above-mentioned invertor device as disclosed in Japanese Provisional Patent Publication (Kokai) No. 60-82098.

According to this publication, a sine wave signal which determines the output frequency and the output voltage is compared with a triangular wave signal as a modulation carrier by a comparator, and a pulse width-modulated signal having a pulse width dependent upon the comparison result is supplied to the invertor device for switching control thereby. The sine wave signal has its amplitude corrected in a feedback manner responsive to detected output voltage.

However, as a result of the above feedback correction, the amplitude of the sine wave signal can be larger than that of the triangular wave signal, e.g. when the sine wave signal has an increased peak as a result of feedback correction to correct the waveform of the output voltage having a distorted peak. Consequently, the resulting pulse width-modulated signal is held at a high level or a low level. In such a case, if the invertor device is constructed such that the pulse width-modulated signal is supplied to a bridge circuit formed of FETS or the like via pulse transformers, the pulse width-modulated signal cannot be transmitted to the secondary side of the pulse transformers so that the inverter device cannot perform its switching operation.

SUMMARY OF THE INVENTION

It is an object of the invention to provide a pulse wide-modulation control device for an invertor device, which is capable of allowing the invertor device to continue its switching operation without interruption, even when the amplitude of the sine wave signal exceeds that of the triangular wave signal.

It is a further object of the invention to provide a pulse width-modulation control system for an invertor device, which has pulse transformers compact in size.

To attain the first-mentioned object, the present invention provides a pulse width-modulation control device for performing switching control of an invertor device having switching means for effecting switching control of a direct current power output, and an output circuit for supplying alternating current, responsive to the switching control of the switching means, the pulse width-modulation control device comprising: a sine wave signal creating circuit for creating a sine wave signal having a predetermined frequency; a triangular wave signal creating circuit for creating a triangular wave signal as a carrier signal, having a frequency higher than the predetermined frequency; a superposed signal creating circuit for superposing the sine wave signal upon the triangular wave signal to form a superposed signal; a pulse width modulating circuit for comparing the superposed signal with a predetermined threshold level to form a pulse width modulated signal; and a pulse width limiting circuit for limiting the pulse width of the pulse width modulated signal when the pulse width modulated signal has a pulse width lying outside a predetermined range, and supplying a pulse signal having a pulse width thus limited to the switching means.

Preferably, the pulse width-modulation control device includes high frequency signal generator means for generating a signal having a frequency higher than the predetermined frequency, the pulse width limiting circuit comprising a pulse signal creating means responsive to the signal generated by the high frequency signal generator means for creating a pulse signal having maximum and minimum pulse widths, and a selecting means which supplies the pulse signal created by the pulse signal creating means to the switching means when the pulse width modulated signal has a pulse width lying outside the predetermined range, and supplies the pulse width modulated signal to the switching means when the pulse width modulated signal has a pulse width lying within the predetermined range.

More preferably, the pulse width-modulation control device includes a shift detecting circuit for detecting an amount of shift of a direct component shift amount from an output voltage from the output circuit, and a shift correcting circuit for correcting the sine wave signal based upon the amount of shift detected by the shift detecting circuit.

To attain the second-mentioned object as well as the first-mentioned object, the invertor device comprises a plurality of pulse transformers, each having a primary coil and a secondary coil, a plurality of field effect transistors bridge-connected with each other and forming the switching means, the field effect transistors each having a gate and a source, and a gate control circuit associated with each of the field effect transistors and operable to feed an output signal from the pulse width limiting circuit through a corresponding one of the pulse transformers to the gate of the each field effect transistor for causing switching operation thereof, the gate control circuit comprising a first capacitor connected to the primary coil of the corresponding pulse transformer for removing low frequency components from the output signal from the pulse width limiting circuit and feeding the output signal thus having low frequency components removed to the primary coil of the corresponding pulse transformer, a series circuit formed by a damping resistance and a second capacitor for demodulation and connected to the secondary coil of the corresponding pulse transformer, and a two-way voltage limitter connected between the series circuit and the each field effect transistor for stabilizing voltage between the gate and the source of the each field effect transistor.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1A:
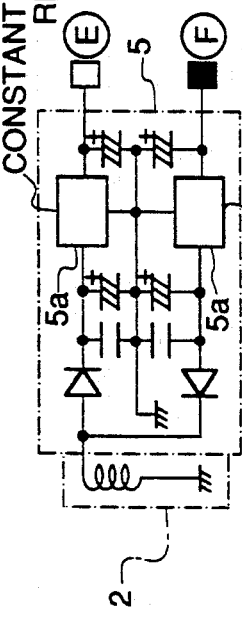
FIGS. 1 (a) and (b) are circuit diagrams showing the whole arrangement of a portable AC power unit incorporating an invertor device having a pulse width-modulation control device according to the invention.
Figure 1A:
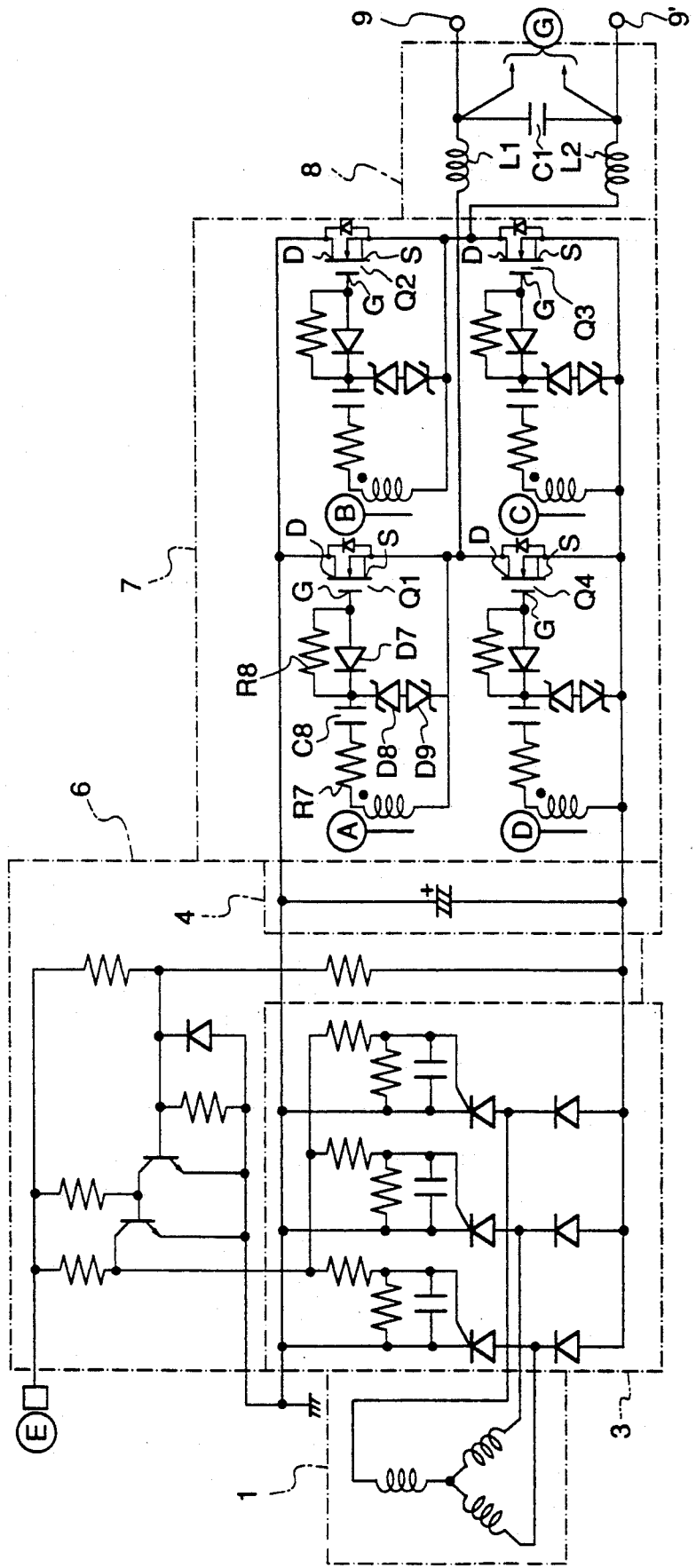

Referring first to FIGS. 1 (a) and (b), there is shown the whole arrangement of a portable AC power unit incorporating an invertor device having a pulse width-modulation control device according to the invention.

In FIG. 1 (a), reference numerals 1 and 2 designate respectively a three-phase output winding and a single-phase auxiliary winding (control winding) wound on a common stator core, not shown, of an AC generator, separately from each other.

A magnet rotor, not shown, having a plurality of magnetic poles is arranged to be rotatively driven by an engine, not shown. The three-phase output winding 1 has its output connected to a bridge rectifier 3 comprised of three thyristors and three diodes, which in turn has its output connected to a smoothing circuit 4. The bridge rectifier 3 and the smoothing circuit 4 cooperatively form a direct current power source circuit.

The single-phase auxiliary winding 2 has its output connected to a constant-voltage regulator circuit 5 having positive and negative output terminals E and F. The constant-voltage regulator circuit 5 has two sets of rectifiers, smoothing circuits, and constant-voltage regulators 5a, one set being operable in response to current flowing in one direction from the auxiliary winding 2, the other set in response to current flowing in the other direction from the winding 2 so that the output terminals E, F supply positive constant voltage and negative constant voltage, respectively.

Reference numeral 6 designates a thyristor control circuit which has a power source-input terminal connected to the positive output terminal E of the constant-voltage regulator circuit 5, and another terminal grounded together with a positive terminal of the smoothing circuit 4. The thyristor control circuit 6 has a signal-input terminal connected to a negative terminal of the smoothing circuit 4, and a signal-output terminal connected to gate input circuits of the thyristors of the bridge rectifier 3.

With the above arrangement, three-phase alternating current from the three-phase output winding 1 is rectified by the bridge rectifier 3, and smoothed into direct current voltage by the smoothing circuit 4. Fluctuations in the direct current voltage from the smoothing circuit 4 are detected by the thyristor control circuit 6 to thereby control turning-on and -off of the thyristors of the bridge rectifier 3 so that the output voltage from the smoothing circuit 4 can be stably maintained in a feedback manner.

Details of the above control by the thyristor control circuit are disclosed in Japanese Provisional Patent Publication (Kokai) No. 3-93499 and Japanese Provisional Utility Model Publication (Kokai) No. 3-26300.

The smoothing circuit 4 has its output connected to an invertor 7. The invertor 7 is formed by a bridge circuit composed of four FETS (field effect transistors) Q1–Q4 as switching elements which have their gates connected to a driving signal circuit, hereinafter referred to.

The junction between the FET's Q1 and Q4 and the junction between the FET's Q2 and Q3 are connected respectively to output terminals 9 and 9' via a low-pass filter 8. A load, not shown, is to be connected to the output terminals 9, 9'. The low-pass filter 8 is formed of coils L1 and L2 connected in series to the load, and a capacitor C1 connected in parallel with the load, and acts to pass low frequency components (commercial frequency components in the present embodiment) in the output from the invertor 7 to thereby supply commercial frequency output power to the load through the output terminals 9, 9'.

The capacitor C1 of the low-pass filter 8 has its opposite ends G connected respectively to ends of series circuits formed by resistances R1 and R2, and R3 and R4, shown in FIG. 1 (b). The other ends of these series circuits are connected to the positive output terminal E of the constant-voltage regulator circuit 5. The junction between the resistances R1, R2 and the junction between the resistances R3, R4 are connected respectively to a positive input terminal and a negative input terminal of a differential amplifier 101 through respective resistances R10 and R11, with a capacitor C2 for cutting off high frequency components connected between the two junctions. The differential amplifier 101 comprises an operational amplifier which has the positive input terminal grounded via a capacitor C3 for cutting off high frequency components. The resistances R1–R4, capacitor C2 and differential amplifier 101 cooperate to form a shift detecting circuit which detects an amount of shift of the direct current component in the output voltage.

In FIG. 1 (b), reference numeral 102 designates a sine wave generator which generate a sine wave signal having a commercial frequency, e.g. 50 Hz or 60 Hz. The output of the sine wave generator 102 is connected to a negative input terminal of a differential amplifier (shift correction circuit) 103, while the output of the differential amplifier 101 is connected to a positive input terminal of the differential amplifier 103.

Reference numeral 104 designates a square wave generator (high frequency signal generator means) which generates a square wave signal having a pulse repetition period which is longer than the response time of an invertor buffer 106, hereinafter referred to, which is approximately 50 nsec, but by far faster than the response time of approximately 1 μsec of a conventional comparator. Therefore, the frequency of the square wave signal can be set to a frequency much higher than the frequencies of conventional PWM carrier waves (triangular waves).

The output of the square wave generator 104 is connected to an integrating circuit (triangular wave generator) 105 which has its output connected to the output of the differential amplifier 103 such that the two circuits 105, 103 cooperatively form a superposed signal creating circuit. The two connected outputs are connected to the input of the invertor buffer (pulse width modulating circuit) 106. The invertor buffer 106 is formed by an amplifier with a predetermined fixed threshold level which operates such that when a signal having a level exceeding the threshold level is inputted, it outputs an amplified low level signal, while when a signal having a level below the threshold value is inputted, it outputs an amplified high level signal. The invertor buffer 106 may be formed by an IC device designed for use as a buffer having a fixed threshold level relative to its gate input level, such as a C-MOS gate. The output of the invertor buffer 106 is connected to an input terminal of a NAND circuit 107.

The output of the square wave generator 104 is connected to a differentiation circuit 110 via an invertor buffer 108, and further to a differentiation circuit 111 via a dual invertor buffer 109. The differentiation circuit 110 is composed of a coupling capacitor C4 connected between the output of the invertor buffer 108 and the output of the circuit 110, and a parallel circuit formed by a diode D1 with its anode connected to the negative output terminal F and a resistance R5 connected to negative output terminal F. The other differentiation circuit 111 has the identical configuration with the differentiation circuit 110 and is composed of a coupling capacitor C5, a diode D2, and a resistance R6.

The output of the differentiation circuit 110 is connected to the other input terminal of the NAND circuit 107 via an invertor buffer 112. The output of the NAND circuit 107 is connected to one input terminal of a NAND circuit 114 which has another input terminal connected to the output of the differentiation circuit 111 via an invertor buffer 113. The circuits 107-114 cooperate to form a pulse width limiting circuit.

The output of the NAND circuit 114 is connected via a dual invertor buffer 115 to a push-pull amplifier 116 composed of transistors Q5 and Q6. The transistor Q5 of the push-pull amplifier 116 has its collector connected to the positive output terminal of the constant-voltage regulator circuit 5, and the transistor Q6 has its collector connected to the negative output terminal F of the constant-voltage regulator circuit 5.

The output of the push-pull amplifier 116, i.e. the junction between emitters of the transistors Q5, Q6 is connected to the junction of an anode of a diode D3 and a cathode of a diode D4. The diode D3 has its cathode connected to the positive output terminal E of the constant-voltage regulator circuit 5, and the diode D4 has its anode connected to the negative output terminal F of the regulator circuit 5. The diodes D3, D4 cooperate to damp surging occurring at pulse transformers, hereinafter referred to.

The junction between the anode of the diode D3 and the cathode of the diode D4 is connected to ends of primary coils L3 and L4 of pulse transformers A, C via a capacitor C6 for cutting off low frequency components. The other ends of the primary coils L3, L4 are connected to the negative output terminal F of the constant-voltage regulator circuit 5. The capacitor C6 has a as to pass only the PWM carrier frequency signal which has a relatively high frequency and cuts off low frequency components.

The output of the NAND circuit 114 is connected by way of an invertor buffer 117 to a push-pull amplifier 118 composed of transistors Q7 and Q6 like the push-pull amplifier 116, and its output is connected to the junction between an anode of a diode D5 and a cathode of a diode D6. This junction is connected to ends of primary coils L5 and L6 of pulse transformers B and D via a capacitor C7 which has a constant so as to pass only the PWM carrier frequency signal and cuts off low frequency components like the capacitor C6.

Referring again to FIG. 1(a), the driving signal circuit which is connected to gates of the FETS Q1-Q4 will be described. One end of the secondary coil of the pulse transformer A is connected to a gate of the FET Q1 via a series circuit formed by a damping resistance R7, and a demodulating capacitor C8, and a parallel circuit formed by a resistance R8 and a diode D7, while the other end of the secondary coil of the pulse transformer A is connected to a source of the FET Q2. The junction between the capacitor C8, and the parallel circuit formed by the resistance R8 and the diode D7 is connected to the above other end of the secondary coil of the pulse transformer A via Zener diodes D8 and D9. The diode D7 has its anode connected to the gate of the FET Q1, and the Zener diodes D8, D9 have their anodes connected with each other. The diodes D8, D9 cooperate to form a two-way voltage limiter for stabilizing voltage between the gate and source of the FET Q1. The capacitor C6, the series circuit of the resistance R7 and capacitor C8, and the Zener diodes D8, D9 cooperate to form a gate control circuit which causes switching operation of the FET Q1 in response to an output signal from the aforementioned pulse width limiting circuit formed by circuits 107-114.

Provided between a secondary coil of each of the pulse transformers B, C and D and a gate of a corresponding one of the FETS Q2-Q4 is the same circuitry as the above described one provided between the secondary coil of the pulse transformer A and the gate of the FET Q1.

Figure 1B:
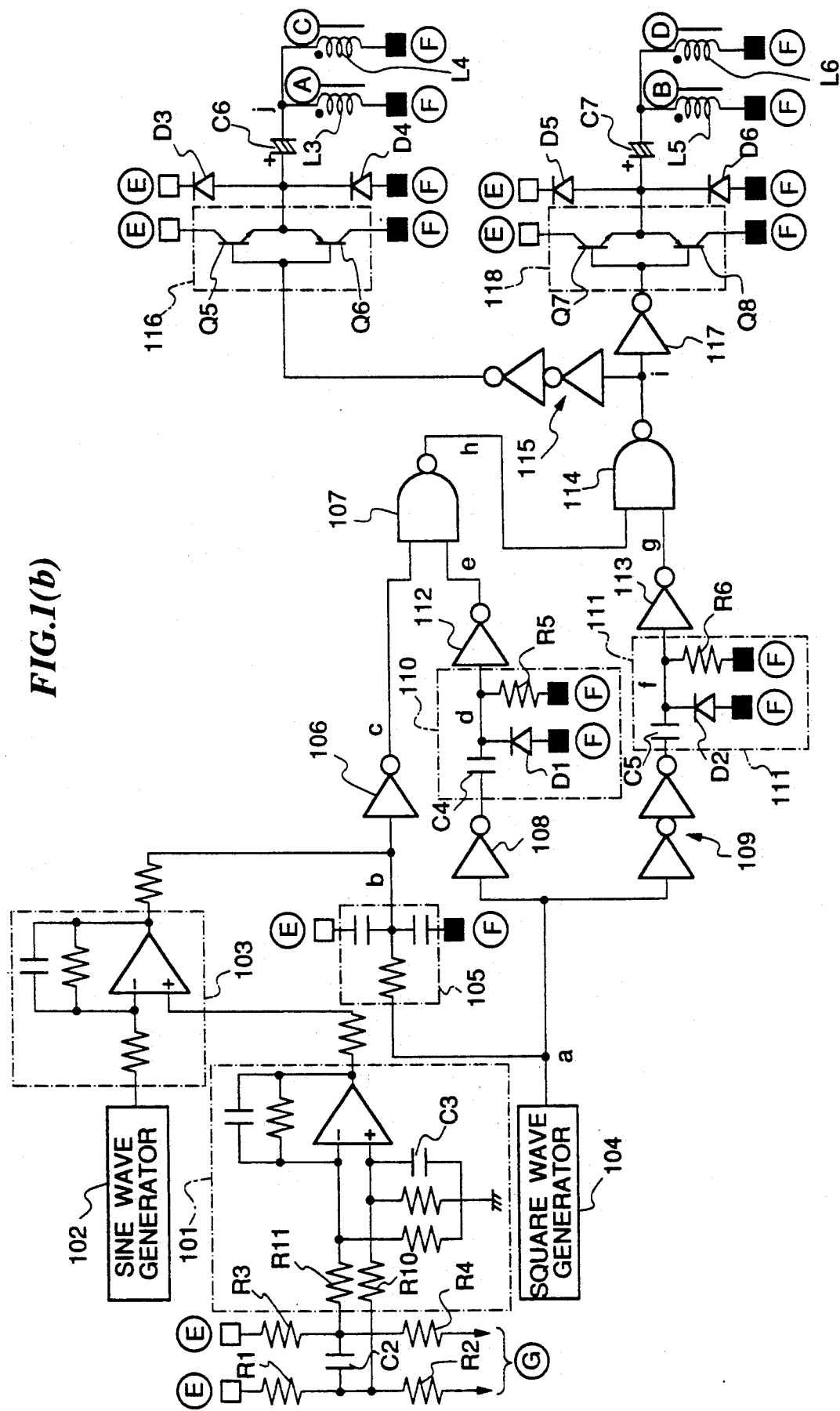

The operation of the invertor device comprised of the invertor 7, the low-pass filter 8, and the circuitry of FIG. 1(b) will be described in detail with reference to signal waveforms shown in FIG. 2 through FIG. 5:

The FETS Q1, Q3 and the FETS Q2, Q4 have their gates supplied with a pulse width-modulated (PWM) signal, hereinafter referred to, so that the FETS Q1, Q3 are caused to conduct alternately, and so do the FETS Q2, Q4 to effect switching control of the output from the smoothing circuit 4. The switch-controlled output is applied to the low-pass filter 8 where high frequency components thereof are removed. The output from the low-pass filter 8 is supplied through the output terminals 9, 9' to the load as commercial frequency AC power.

The waveforms of output voltage from the output terminals 9 and output voltage from the output terminal 9' are fed through the dividing resistances R1, R2, and R3, R4 and are compared with each other by the differential amplifier 101, which detects the difference between the two waveforms, which is indicative of a distortion and/or offset component(s) in the output voltage, amplifies same. The output from the differential amplifier 101 is fed to the differential amplifier 103. By thus comparing between the waveforms of output voltage at the output terminals 9, 9', distortion in the output voltage waveform can be detected with high accuracy. The capacitors C2, C3 act to remove high frequency components from the differential signal, and the capacitor C3 also removes disturbances applied to the differential amplifier 103.

Figure 2:
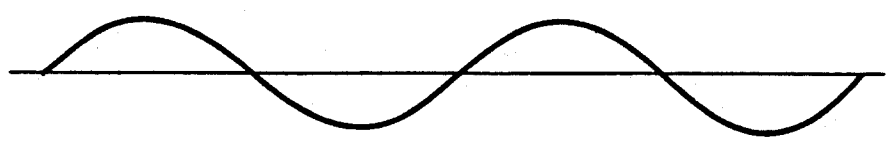
FIG. 2 is a timing chart showing signal waveforms at various points in the invertor device.
Figure 2:
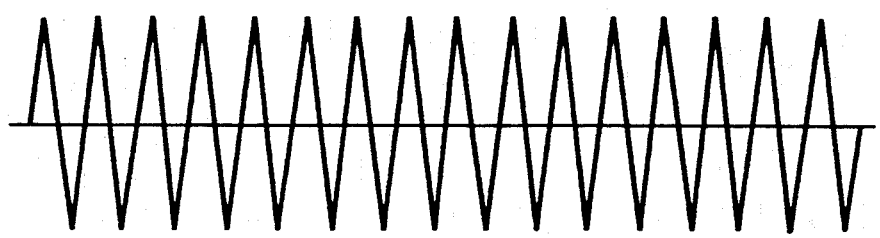
Figure 2:
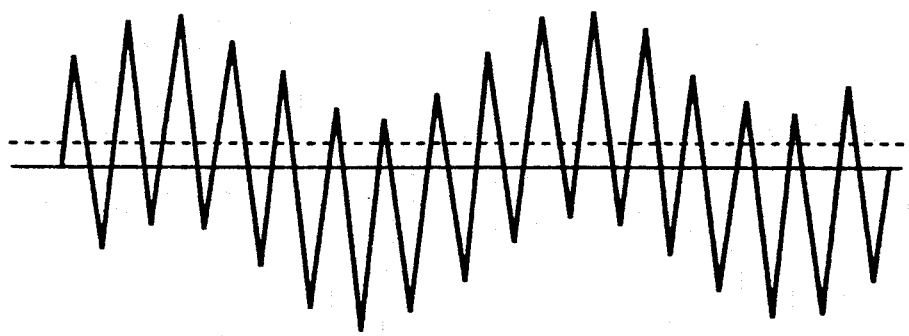
Figure 2:
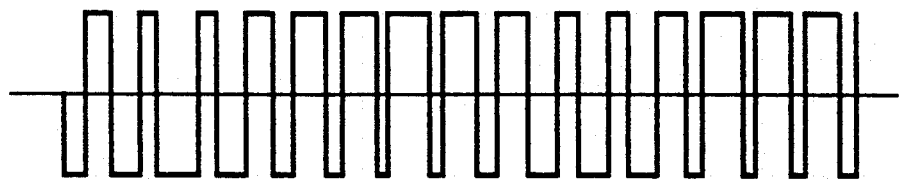
Figure 2:
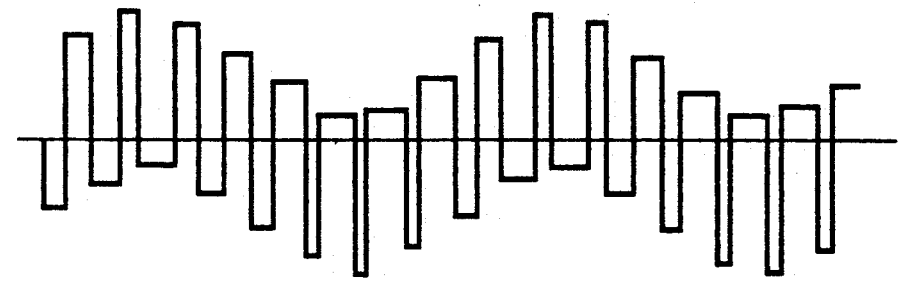

The differential amplifier 103 compares the sine wave signal having a commercial frequency from the sine wave generator 102 with a feedback signal which is direct current, outputted from the differential amplifier 101, and outputs a sine wave signal b'' having the commercial frequency, which has its amplitude reference level corrected by the feedback signal, as appearing at (b'') in FIG. 2. Since the PWM signal is created based upon this corrected sine wave signal as described hereinafter, it is possible to reduce distortion and offset components in the waveform of the output voltage attributed to variations in the threshold level of the invertor buffer 106, variations in the temperature characteristics of various component parts, etc.

Figure 3:
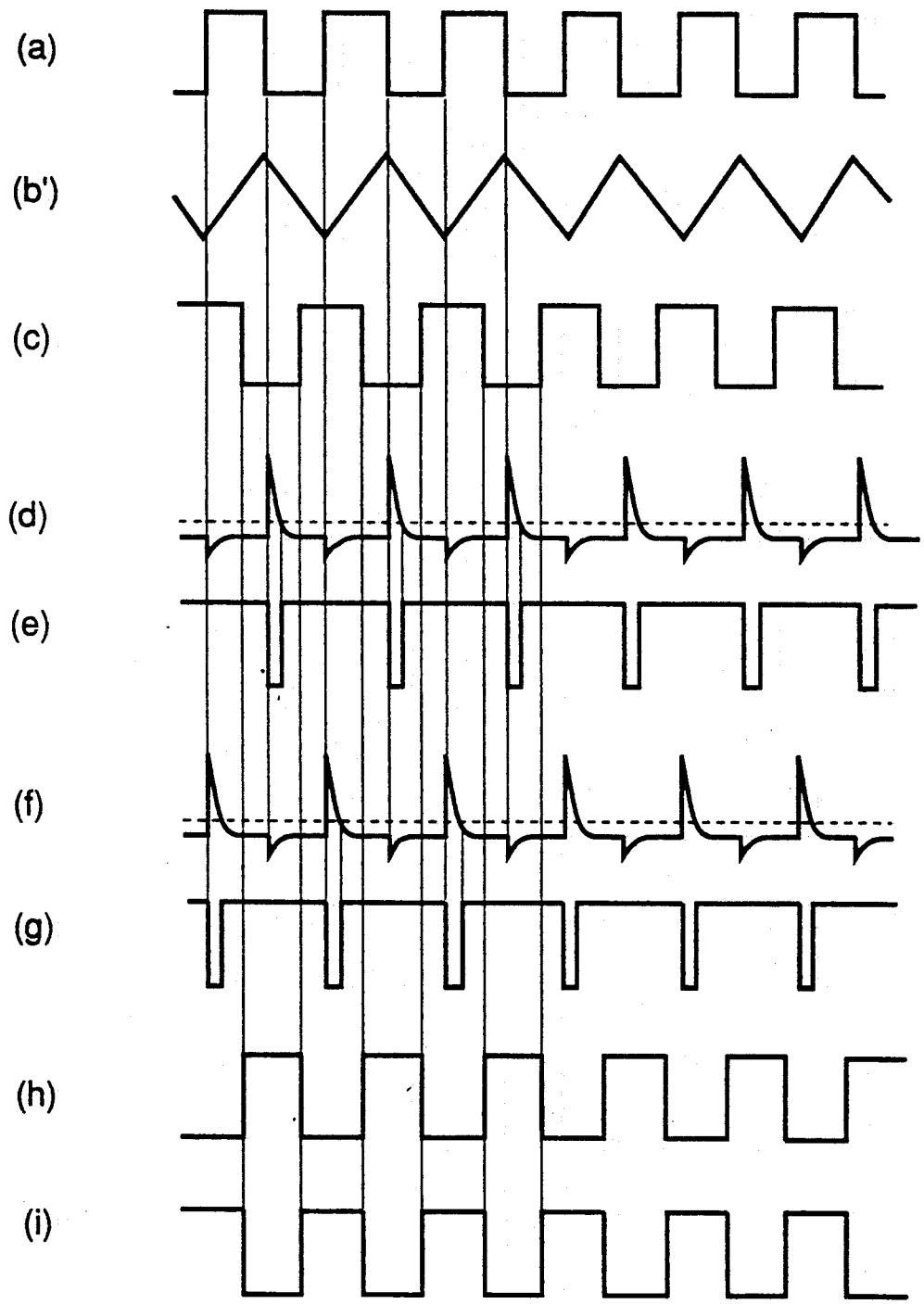
FIG. 3 is a timing chart showing signal waveforms at various points in the invertor device.

The square wave signal (at (a) in FIG. 3) from the square wave generator 104 is integrated by the integrating circuit 105 into a triangular wave signal b' appearing at (b') in FIG. 2 and (b') in FIG. 3. This triangular wave signal b' is superposed upon the corrected sine wave signal b'' from the differential amplifier 103 into a superposed signal appearing at (b) in FIG. 2, which is supplied to the invertor buffer 106. The invertor buffer 106 operates to generate a low level output when supplied with an input having a level exceeding its threshold level indicated by the broken line at (b) in FIG. 2, and generate a high level output when supplied with an input having a level below the threshold level, as shown at (c) in FIG. 2.

The resulting pulse train signal c from the invertor buffer 106 is a pulse width-modulated (PWM) signal obtained by pulse width modulation by the sine wave signal b'' with the triangular wave signal b' as the carrier wave. Then, how this PWM signal c will be processed into an output signal i from the NAND circuit 114 will now be explained. For the convenience of explanation, the PWM signal is shown in a simplified form having a constant pulse width as shown at (c) in FIG. 3.

The square wave signal (at (a) in FIG. 3) from the square wave generator 104 is inverted by the invertor buffer 108, followed by differentiation at the differentiation circuit 110 into a signal appearing at (d) in FIG. 3. Specifically, whenever the square wave signal ((a) in FIG. 3) falls, the capacitor C4 is charged through the resistance R5 so that a positive pulse appears as shown at (d) in FIG. 3, while whenever the square wave signal rises, the capacitor C4 is discharged through the diode D1 so that a negative pulse appears as shown at (d) in FIG. 3.

The output signal d from the differentiation circuit 110 is inverted by the invertor buffer 112 with respect to its threshold level indicated by the broken line at (d) in FIG. 3, into a signal e as shown at (e) in FIG. 3. The output signal e from the invertor buffer 112 and the output signal (at (c) in FIG. 3) from the invertor buffer 106 are applied to the NAND circuit 107, which is responsive to the input signals to generate a signal h as shown at (h) in FIG. 3.

Further, the square wave signal (at (a) in FIG. 3) from the square wave generator 104 is fed through the dual invertor buffer 109 and then differentiated by the differentiation circuit 111 into a signal f as shown at (f) in FIG. 3. The differentiated signal f is inverted by the invertor buffer 113 with respect to its threshold level indicated by the broken line at (f) in FIG. 3 into a signal g appearing at (g) in FIG. 3. Thus, the same signal processing is carried out by the differentiation circuit 111 and the invertor buffer 113 as that by the differentiation circuit 110 and the invertor buffer 112 described above.

The NAND circuit 114 is supplied with the output signal (at (h) in FIG. 3) from the NAND circuit 107 and the output signal (at (g) in FIG. 3) from the invertor buffer 113, to generate a signal as shown at (i) in FIG. 3.

Figure 4:
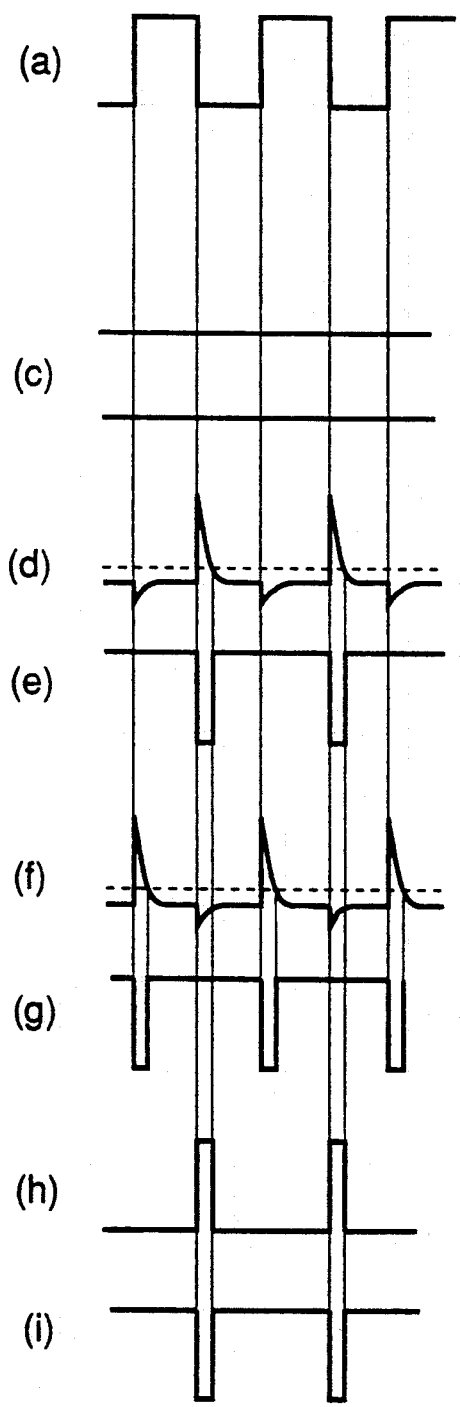
FIG. 4 is a timing chart showing signal waveforms at various points in the invertor device, obtained in the case where a failsafe operation is performed due to output from an invertor buffer in FIG. 1 (b) being held at a high level.

As mentioned before, in case that distortions occur in the output voltage waveform due to a load connected to the output terminals 9, 9', etc., feedback control is carried out so as to make the output voltage waveform close to the sine waveform. However, when a large load such as an electric motor is connected to the output terminals 9, 9', a very large waveform distortion can occur, though temporarily. In such a case, the amplitude of the sine wave signal at (b'') in FIG. 2 from the differential amplifier 103 is corrected by a large amount by the feedback signal from the differential amplifier 101 to such an extent that the amplitude of the sine wave signal becomes larger than that of the triangular wave signal. As a result, the superposed signal at (b) in FIG. 2 continuously lies only on one side with respect to the threshold level indicated by the broken line at (b) in FIG. 2. Consequently, the output from the invertor buffer 106 is held at a high level (if the maximum level of the superposed signal continuously lies below the threshold level), or it is held at a low level (if the minimum level of the superposed signal continuously lies above the threshold level). That is, the output from the invertor buffer 106 becomes direct current to make it impossible to carry out signal transmission by the pulse transformers. To overcome this disadvantage, the present invention provides output signals from the invertor buffers 112, 113, which operate as follows:

For instance, if the output from the invertor buffer 106 is held at a high level as at (c) in FIG. 4, the output signals from the invertor buffers 112, 113 regularly vary as usual, respectively as shown at (e) and (g) in FIG. 4, irrespective of the state of the output from the invertor buffer 106. Accordingly, the pulse width of the output signal from the NAND circuit 107 is limited by the pulse width of the output signal e from the invertor buffer 112 into a signal appearing at (h) in FIG. 4, and hence the output signal from the NAND circuit 114 appears as shown at (i) in FIG. 4.

Figure 5:
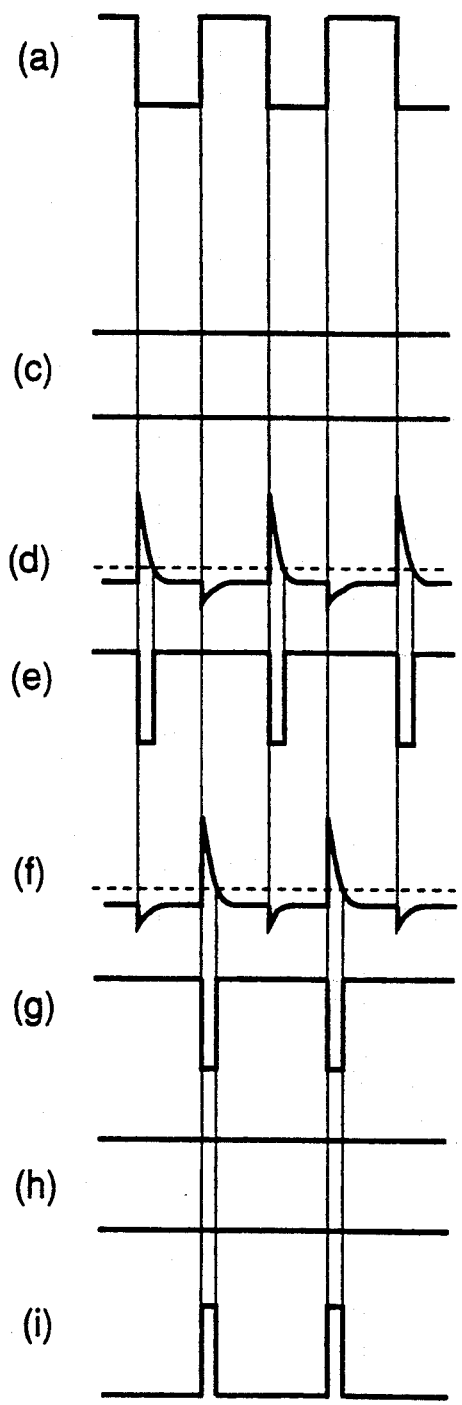
FIG. 5 is a timing chart similar to FIG. 4 in the case where a failsafe operation is performed due to the invertor buffer output being held at a low level.

On the other hand, if the output from the invertor buffer 106 is held at a low level as at (c) in FIG. 5, the output signals from the invertor buffers 112, 113 regularly vary as usual, respectively as shown at (e) and (g) in FIG. 5. Accordingly, the output signal from the NAND circuit 107 appears as shown at (h) in FIG. 5. Therefore, the pulse width of the output signal from the NAND circuit 114 is limited by the pulse width of the output signal g from the invertor buffer 113 into a signal as shown at (i) in FIG. 5. Thus, even when there occurs a large distortion or offset in the waveform of the output voltage, the NAND circuit 114 continues to generate as the PWM signal a pulse train which has a pulse width limited by the minimum pulse width or the maximum pulse width as shown at (i) in FIG. 4 or (i) in FIG. 5 as long as the superposed signal continuously exceeds or lie below the threshold level. By virtue of this failsafe operation, the invertor device can continue its operation.

Reference is now made to processing of the PWM signal after being outputted from the NAND circuit 114. This PWM signal is fed through the dual invertor buffer 115, amplified by the push-pull amplifier 116, and applied to the capacitor C6 to have its low frequency components removed. Before passing the capacitor C6, the PWM signal has constant amplitude with respect to the reference level but the average voltage (integrated value) of this signal varies with the same period as the sine wave signal from the sine wave generator 102. Therefore, this PWM signal contains a component of the same frequency as that of the sine wave signal (commercial frequency).

Since the capacitor C6 does not pass low frequency components, i.e. a commercial frequency component in the present embodiment, but passes only the PWM carrier frequency signal which is high in frequency, the PWM signal, after having passed the capacitor C6, is converted into a pulse train which varies as a whole in reverse phase to the commercial frequency component and always has a zero average voltage. This pulse train always having a zero average voltage is applied to the primary coils L3, L4 of the pulse transformers A, C. Therefore, cores of the pulse transformers A, C are almost not magnetically saturated due to the commercial frequency component, making it possible to use small-sized cores without the fear of being magnetically saturated at the PWM carrier frequency.

An output pulse signal, which is almost identical with the signal at (j) in FIG. 2, from the secondary coil of the pulse transformer A is compared with the breakdown voltage of each of the Zener diodes D8, D9 which form a two-way voltage limiter. When the output pulse signal exceeds the corresponding breakdown voltage in the positive direction or the negative direction, the Zener diode D8 or D9 conducts to thereby limit the voltage of the output pulse signal. At the same time, the capacitor C8 is charged or discharged in response to conduction or cutting-off of the Zener diode D8, D9 so that a voltage occurs across the capacitor C8, which is an average voltage of the amounts by which the output pulse signal exceeds the breakdown voltages of the Zener diodes D8, D9, the average voltage having the commercial frequency. Therefore, a signal which is obtained by superposition of the terminal voltage of the capacitor C8 having the commercial frequency and the output pulse signal from the secondary coil of the pulse transformer A, i.e. the PWM signal before passing the capacitor C6 ((c) in FIG. 2) is reproduced between the gate and source of the FET Q1. The FET Q1 conducts while each positive pulse of the PWM signal is applied to its gate.

The constant of the capacitor C8 is set at a value greater than the gate capacitance of the FET Q1, and the constant of the resistance R7 is set at a value corresponding to a Q value at which the pulse transformer A and the capacitor C8 do not resonate. The resistance R8 determines the switching speed of the FET Q1. The diode D7 quickly discharges a charge so far charged in the gate capacitance of the FET Q1 when voltage applied to the gate of the FET Q1 drops, to thereby immediately cut off the FET Q1.

An output pulse signal from the secondary coil of the pulse transformer C is also processed in the same manner as the output pulse signal from the pulse transformer A. Thus, switching of the FET Q3 takes place at the same timing as the FET Q1 so that upon inputting of each positive pulse of the PWM signal, the FETS Q1 and Q3 conduct simultaneously to cause direct current from the smoothing circuit 4 to be supplied to the low-pass filter 8.

The PWM signal from the NAND circuit 114 is also fed through the invertor buffer 117 and then subjected to signal processing in the same manner as the above described signal circuit from the push-pull amplifier 116 to the FETS Q1, Q3, and switching of the FETS Q2, Q4 is controlled in response to the PWM signal. But, due to the presence of the invertor buffer 117, the PWM signal in this signal circuit is reverse in phase to the PWM signal in the signal circuit from the push-pull amplifier 116 to the FETS Q1, Q3. Consequently, when the FETS Q1, Q3 conduct, the FETS Q2, Q4 are cut off, whereas when the former are cut off, the latter conduct.

As described above, in this embodiment, the invertor 7 carries out switching control based upon a PWM signal which is formed by modulating a sine wave signal having a commercial frequency by a high frequency triangular wave signal, and then a carrier frequency component contained in the switched output from the invertor 7 is removed by the low-pass filter 8, whereby alternating current output having the commercial frequency, which is close in waveform to the sine wave signal is supplied through the output terminals 9, 9' to the load.

As described above, according to the invention, the following excellent results can be obtained:

(i) Since the pulse width-modulation control device includes a superposed signal creating circuit which superposes a sine wave signal from a sine wave creating circuit upon a triangular wave carrier signal from a triangular wave signal creating circuit to create a superposed signal, a pulse width modulating circuit compares the superposed signal with a predetermined threshold level (and preferably amplifies the superposed signal by an amplifier with a fixed threshold level) to create a pulse width modulated signal. A pulse width limiting circuit which, when the pulse width modulated signal has a pulse width lying outside a predetermined range, limits the pulse width of the pulse width modulated signal, and supplies a pulse signal having the pulse width thus limited to a switching device. Thus, the switching device can continue its switching operation based upon the carrier frequency even when the amplitude of the sine wave signal exceeds the amplitude of the triangular wave carrier signal.

(ii) Since the pulse width-modulation control device includes a shift detecting circuit which detects an amount of shift of the direct current component in the output voltage, and a shift correcting circuit connected to the square wave creating circuit for correcting the sine wave signal in response to the amount of shift detected by the shift detecting circuit, a switching circuit which carries out switching control of an output from a direct current power source circuit is supplied with a pulse signal and hence able to continue its switching operation even when the amplitude of the sine wave signal is corrected in response to an offset in the output voltage to exceed the amplitude of the triangular wave carrier signal.

(iii) The switching device comprises a plurality of FETS bridge-connected with each other, and the invertor device includes a gate control circuit which allows a pulse width modulated signal or an output signal from the pulse width limiting circuit to be supplied to a gate of each of the FETS via a corresponding one of pulse transformers for causing the FETS to carry out a switching operation. The gate control circuit comprises a capacitor which removes low frequency components from the output signal from the pulse width limiting circuit and feeds the output signal thus having low frequency components removed to a primary coil of each of the pulse transformers, a series circuit formed by a damping resistance and a demodulating capacitor, and a two-way voltage limiter connected between the series circuit and a corresponding one of the FETS for stabilizing voltage between the gate and source of the corresponding FET, the pulse transformers can be designed compact in size. Further, even when the invertor device has its output overloaded such that the amplitude of the sine wave signal is caused to become large by the feedback signal, only peaks of the waveform of alternating current output from the invertor device can be suppressed to thereby allow continued switching operation.

What is claimed is:

1. A pulse width-modulation control device for performing switching control of an invertor device having switching means for effecting switching control of a direct current power input, and an output circuit responsive to said switching control of said switching means for supplying alternating current, the pulse width-modulation control device comprising:

sine wave signal creating circuit means for creating a sine wave signal having a predetermined frequency;

triangular wave signal creating circuit means for creating a triangular wave signal as a carrier signal, having a frequency higher than said predetermined frequency;

superposed signal creating circuit means for superposing said sine wave signal upon said triangular wave signal to form a superposed signal;

pulse width modulating circuit means for comparing said superposed signal with a predetermined threshold level to form a pulse width modulated signal;

high frequency signal generator means for generating a signal having a frequency higher than said predetermined frequency;

pulse width limiting circuit means for limiting the pulse width of said pulse width modulated signal when said pulse width modulated signal has a pulse width lying outside a predetermined range, and for supplying a pulse signal having a pulse width thus limited to said switching means, said pulse width limiting circuit means including pulse signal creating means responsive to said signal generated by said high frequency signal generator means for creating a pulse signal having maximum and minimum pulse widths, and selecting means for supplying said pulse signal created by said pulse signal creating means to said switching means when said pulse width modulated signal has a pulse width lying outside said predetermined range, and for supplying said pulse width modulated signal to said switching means when said pulse width modulated signal has a pulsed width lying within said predetermined range.

2. A pulse width-modulation control device as claimed in claim 1, wherein said pulse width modulating circuit means amplifies said superposed signal with reference to a predetermined fixed threshold level to form said pulse width modulated signal.

3. A pulse width-modulation control device as claimed in claim 1, including shift detecting circuit means for detecting an amount of shift of a direct current component in an output voltage from said output circuit, and shift correcting circuit means for correcting said sine wave signal based upon said amount of shift detected by said shift detecting circuit means.

4. A pulse width-modulation control device as claimed in claim 1, wherein said invertor device comprises a plurality of pulse tranformers, each having a primary coil and a secondary coil, a plurality of field effect transistors bridge-connected with each other and forming said switching means, said field effect transistors each having a gate and a source, and gate control circuit means associated with each of said field effect transistors for feeding an output signal from said pulse width limiting circuit means through a corresponding one of said pulse transformers to the gate of each said field effect transistor, resulting in a switching operation thereof, said gate control circuit means comprising first capacitor means connected to said primarily coil of said corresponding pulse transformer for removing low frequency components in said output signal from said pulse width limiting circuit means and for feeding said output signal having low frequency components removed therefrom to said primary coil of the corresponding pulse transformer, a series circuit formed by a damping resistance and second capacitor means for demodulation and connected to said secondary coil of the corresponding pulse transformer, and two-way voltage limiter means connected between said series circuit and each said field effect transistor for stabilizing voltage between the gate and the source of each said field effect transistor.

5. A pulse width-modulation control device for performing switching control of an invertor device having switching means for effecting switching control of a direct current power input, and an output circuit responsive to said switching control of said switching means for supplying alternating current, the pulse width-modulation control device comprising:

sine wave signal creating circuit means for creating a sine wave signal having a predetermined frequency;

triangular wave signal creating circuit means for creating a triangular wave signal as a carrier signal, having a frequency higher than said predetermined frequency;

superposed signal creating circuit means for superposing said sine wave signal upon said triangular wave signal to form a superposed signal;

pulse width modulating circuit means for comparing said superposed signal with a predetermined threshold level to form a pulse width modulated signal;

pulse width limiting circuit means for limiting the pulse width of said pulse width modulated signal to a predetermined value when said pulse width modulated signal has a pulse width lying outside a predetermined range, and for supplying a pulse signal having a pulse width thus limited to the predetermined value to said switching means;

shift detecting circuit means for detecting an amount of shift of a direct current component in an output voltage from said output circuit, and shift correcting circuit means for correcting said sine wave signal based upon said amount of shift detected by said shift detecting circuit.

6. A pulse width-modulation control device as claimed in claim 5, wherein said pulse width modulating circuit means amplifies said superposed signal with reference to a predetermined fixed thereshold level to form said pulse width modulated signal.

7. A pulse width-modulation control device as claimed in claim 5, wherein said invertor device comprises a plurality of pulse transformers, each having a primary coil and a secondary coil, a plurality of field effect transistors bridge-connected with each other and forming said switching means, said field effect transistors each having a gate and a source, and gate control circuit means associated with each of said field effect transistors for feeding an output signal from said pulse width limiting circuit means through a corresponding one of said pulse transformers to the gate of each said field effect transistor; resulting in a switching operation thereof, said gate control circuit means comprising first capacitor means connected to said primary coil of said correponding pulse transformer for removing low frequency components in said output signal from said pulse width limiting circuit means and for feeding said output signal having low frequency components removed therefrom to said primary coil of the corresponding pulse transformer, a series circuit formed by a damping resistance and second capacitor means for demodulation and connected to said secondary coil of the corresponding pulse transformer, and two-way voltage limiter means connected between said series circuit and each said field effect transistor for stabilizing voltage between the gate and the source of each said field effect transistor.

* * * * *